US007709738B2

(12) United States Patent
Mirebeau et al.

(10) Patent No.: US 7,709,738 B2
(45) Date of Patent: *May 4, 2010

(54) ELECTRICAL BUSHING FOR A SUPERCONDUCTOR ELEMENT

(75) Inventors: Pierre Mirebeau, Villebon S/yvette (FR); Nicolas Lallouet, Fiennes (FR); Sebastien Delplace, Ardres (FR); Regis Lapierre, Marck (FR)

(73) Assignee: Nexans, Paris (FR)

( * ) Notice: Subject to any disclaimer, the term of this patent is extended or adjusted under 35 U.S.C. 154(b) by 877 days.

This patent is subject to a terminal disclaimer.

(21) Appl. No.: 11/373,853

(22) Filed: Mar. 9, 2006

(65) Prior Publication Data

US 2009/0166084 A1 Jul. 2, 2009

(30) Foreign Application Priority Data

Mar. 17, 2005 (FR) .................................. 05 50695

(51) Int. Cl.
*H02G 15/02* (2006.01)
(52) U.S. Cl. ..................................... 174/73.1
(58) Field of Classification Search ................ 174/73.1, 174/88 R
See application file for complete search history.

(56) References Cited

U.S. PATENT DOCUMENTS 6,333,462 B1 * 12/2001 Quaggia .................... 174/74 R
7,388,148 B2 * 6/2008 Lallouet et al. ............. 174/15.5
2003/0154727 A1 * 8/2003 Ashibe et al. ................ 62/45.1

FOREIGN PATENT DOCUMENTS

| EP | 0780926 | 12/1996 |
|---|---|---|
| EP | 1283576 | 2/2002 |
| EP | 1489693 | 5/2004 |

OTHER PUBLICATIONS

French Search Report- Dec. 15, 2005.

* cited by examiner

*Primary Examiner*—Chau N Nguyen
(74) *Attorney, Agent, or Firm*—Sofer & Haroun LLP.

(57) ABSTRACT

The invention relates to an electrical bushing serving to make a connection at ambient temperature to a superconductor element situated in an enclosure at cryogenic temperature. The electrical bushing passes successively through an enclosure at intermediate temperature between ambient temperature and cryogenic temperature, and an enclosure at ambient temperature, and it comprises a central electrical conductor surrounded by an electrically insulating sheath. According to the invention, an electrically conductive screen connected to ground potential surrounds the insulating sheath over a section that extends from the end of the bushing that is in contact with the enclosure at cryogenic temperature at least as far as the junction between the enclosure at intermediate temperature and the enclosure at ambient temperature. The invention is more particularly applicable to making a connection to a superconductor cable.

14 Claims, 2 Drawing Sheets

ELECTRICAL BUSHING FOR A SUPERCONDUCTOR ELEMENT

GOVERNMENT LICENSE RIGHTS

This invention was made with government support under contract No. DE-FC36-00GO13032 awarded by the Department of Energy (DOE). The government has certain rights in the invention.

RELATED APPLICATION

This application is related to and claims the benefit of priority from French Patent Application No. 05 50695, filed on Mar. 17, 2005, the entirety of which is incorporated herein by reference.

FIELD OF THE INVENTION

The present invention relates to an electrical bushing for a superconductor element, such as a cable for transporting electricity under medium or high voltage. The electrical bushing serves to connect the end of the superconductor element at cryogenic temperature to a device or equipment at ambient temperature, usually in the open air.

BACKGROUND OF THE INVENTION

Because of the large difference in temperature between the superconductor element and the equipment for connecting to said element, i.e. between ambient temperature and cryogenic temperature that may be about −200° C., it is necessary to interpose a connection structure between the element and the equipment in order to make the temperature transition while minimizing heat losses, and while nevertheless complying with electrical constraints due for example to the high voltage when a cable is involved. This structure comprises an electrical bushing made up of mainly of a central conductor surrounded by an insulating sheath, for transporting electricity from the superconductor cable to an outlet connection at ambient temperature. This structure must achieve the temperature transition over a reasonable length while ensuring that heat conduction losses along the electrical bushing are low so as to avoid boiling the cryogenic liquid that cools the cable. The section of the central conductor must therefore not be too great. Nevertheless, a high electric current can lead to heat losses due to the conductor becoming heated by the Joule effect, and under such circumstances it is advantageous to increase the section of the central conductor. There are thus two conflicting requirements.

Another technical problem to be solved is that of controlling the distribution of the electric field created by the medium or high voltage of the central conductor of the electrical bushing so as to avoid breakdowns.

The known solution to the problem of heat losses consists in providing the connection structure with an adiabatic intermediate enclosure, an airlock or "buffer" enclosure so to speak, placed between the portion at cryogenic temperature and the portion of the connection structure at ambient temperature. The electrical bushing passes through the intermediate enclosure. That solution is described in European patent application EP 1 283 576, for example. The side walls of the intermediate enclosure are constituted by the side walls of a cryostat. The bottom and top walls include fastening flanges through which the electrical bushing passes, the bottom wall being adjacent to the cryogenic temperature portion and the top wall being adjacent to the ambient temperature portion.

The intermediate enclosure is either evacuated, or else filled with a gas that provides good insulation both thermally and electrically. The vacuum level or the gas composition needs to be selected in order to achieve both kinds of insulation. The outside wall of the intermediate enclosure is connected to ground potential.

The drawback of that solution lies in the need for good sealing of the intermediate enclosure, and in particular of the places where the electrical bushing passes through the bottom and top walls, thus leading to manufacturing constraints that are difficult and expensive. For example, even a very small leak between the cryogenic temperature portion and the intermediate enclosure (e.g. a leak of about $10^{-8}$ millibars per liter second (mbar/L.s)) inevitably leads to a change in the composition of the gas or to a deterioration in the vacuum level in the intermediate enclosure. If the cryogenic fluid is liquid nitrogen, a leak leads to the presence of gaseous nitrogen in the intermediate enclosure, thus leading firstly to additional consumption of liquid nitrogen, and secondly to a decrease in the thermal and electrical insulation of the intermediate enclosure. Excess pressure in the intermediate enclosure as a result of such a leak is also unsuitable for being controlled by means of safety valves since opening a safety valve would lead to the destruction of the thermal and dielectric insulating medium (vacuum or gas).

OBJECT AND SUMMARY OF THE INVENTION

The present invention provides a solution to that technical problem, in particular by improving the structure of the electrical bushing.

More precisely, the present invention provides an electrical bushing enabling a connection to be made at ambient temperature to a superconductor element situated in an enclosure at cryogenic temperature, said electrical bushing passing in succession through an enclosure at intermediate temperature between ambient temperature and cryogenic temperature, and an enclosure at ambient temperature, said bushing comprising at least a central electrical conductor surrounded by an electrically insulating sheath. According to the invention, an electrically conductive screen connected to ground potential surrounds said insulating sheath over a section extending from the end of the bushing that is in contact with the enclosure at cryogenic temperature at least as far as the junction between the enclosure at intermediate temperature and the enclosure at ambient temperature.

In an embodiment, said screen is constituted by a metal layer bonded to the outside wall of the insulating sheath of said section, e.g. a layer of zinc or a layer of silver-containing paint.

Advantageously, the electrical bushing includes electric field deflector means. For example, the end of the insulating sheath of said section adjacent to the cryogenic enclosure may have a flared shape, which is covered by the electrically conductive screen. The flared shape may be the shape of the top portion of a bulb constituting the end of the insulating sheath of said section adjacent to the cryogenic enclosure. In addition, the end of the insulating sheath of said section situated in the chamber at ambient temperature may advantageously include a stress cone.

Preferably, the coefficients of thermal expansion of the materials constituting the central conductor and the insulating sheath are selected to be approximately identical, such that these materials are compatible with cryogenic temperature and ambient temperature. For example, the insulating sheath may be made of epoxy and the central conductor of aluminum alloy.

The section of the portion of the central conductor that is situated beside the cryogenic enclosure is advantageously smaller, over a determined length, than is the section of the portion of the central conductor situated in the enclosure at ambient temperature.

The intermediate enclosure is preferably filled at least in part with a solid material of low thermal conductivity, for example a foam, such as a cellular glass foam or a polyurethane foam.

BRIEF DESCRIPTION OF THE DRAWINGS

Other advantages and characteristics of the invention appear from the following description of an embodiment of the invention given by way of non-limiting example and with reference to the accompanying drawings, in which.

MORE DETAILED DESCRIPTION

Figure 1:
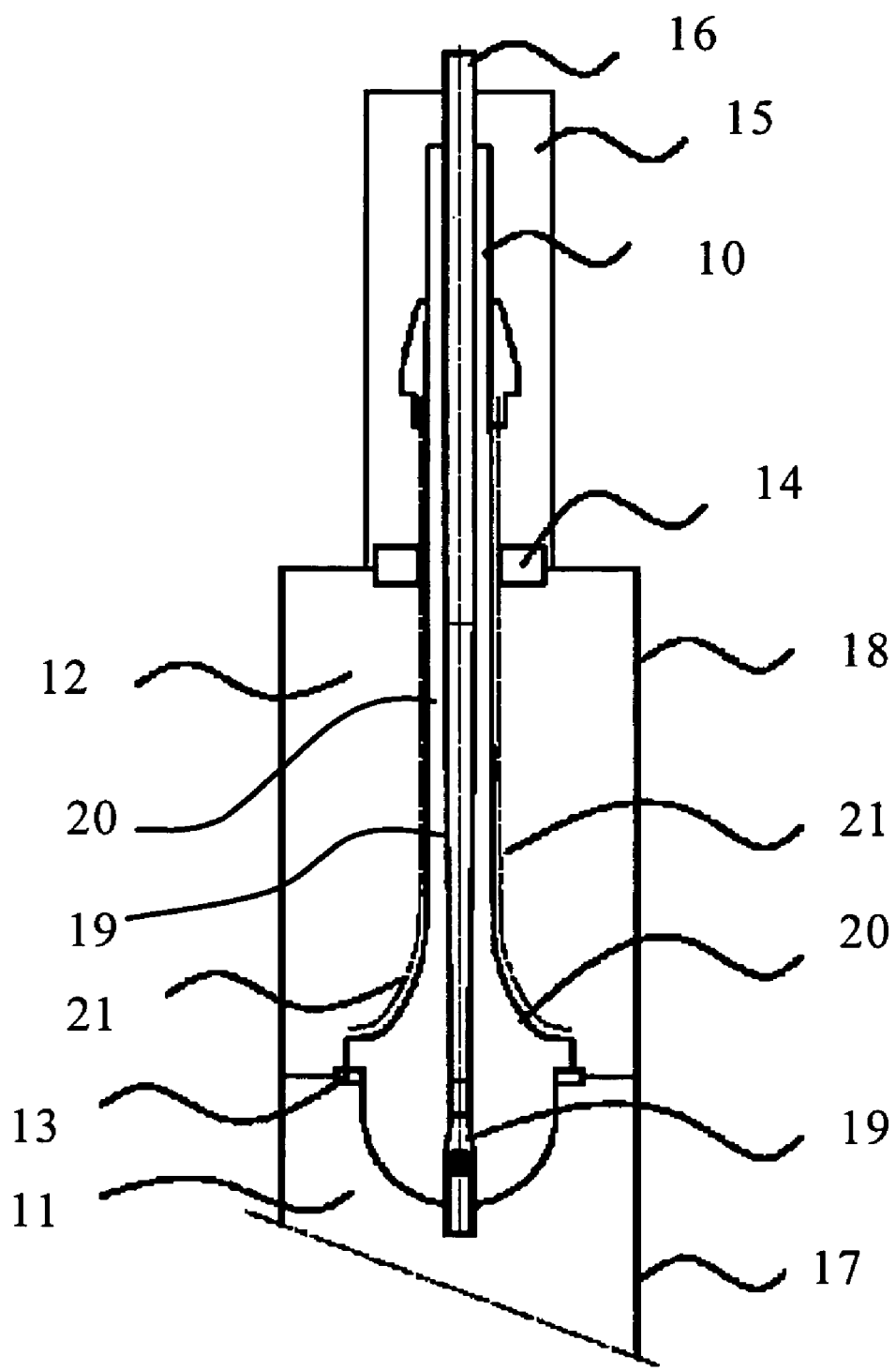
FIG. 1 is a diagram showing the invention.

In FIG. 1, the connection structure to a superconductor cable (not shown) comprises an electrical bushing 10 connected to the superconductor element via its bottom end situated in an enclosure 11 at cryogenic temperature. An intermediate enclosure 12, adjacent to the cryogenic enclosure 11, is preferably filled with a solid material of low thermal conductivity. This material may be in the form of a foam, such as a polyurethane foam or a cellular glass foam, e.g. of the kind commercially available under the trademark Foamglas. The electrical bushing 10 passes through the bottom wall of the intermediate enclosure 11 via a leaktight fastening flange 13, and through the top wall via a leaktight fastening flange 14. The electrical bushing 10 is extended outside the intermediate enclosure 12 through an enclosure 15 at ambient temperature, and is terminated by means 16 for electrically connecting the bushing, and thus the superconductor element, to an appropriate device or equipment. The intermediate enclosure is thus at a temperature lying between ambient temperature and the temperature of the cryogenic fluid. The walls 17 and 18 respectively of the enclosure 11 at cryogenic temperature and of the intermediate enclosure 12 form cryostat walls for good thermal insulation. Since the intermediate enclosure is leak-proof, it is preferably fitted with a safety valve (not shown) in order to mitigate any excess pressure that might arise in the event of leakage past the flanges 13 and 14.

The electrical bushing 10 comprises a central conductor 19 surrounded by an insulating sheath 20. According to the invention, an electrically conductive screen 21, preferably made of metal, surrounds the insulating sheath over at least a section of the sheath, i.e. over a certain length thereof. The screen is advantageously made by metallizing the insulating sheath over said section, which extends from the portion of the intermediate enclosure in contact with cryogenic temperature at least as far as the flange 14, i.e. the junction between the intermediate enclosure 12 and the enclosure 15 at ambient temperature. The screen is electrically connected to ground potential. Its function is to confine the electric field along the conductor in the electrical bushing only, and more precisely, between the central conductor and the screen.

It should be observed that the problem of a small leak past the flanges 13 and 14 is practically eliminated when the intermediate enclosure 12 is filled with a solid material, and not a gas or a vacuum. The effectiveness of thermal insulation is maintained at a level that is relatively constant even if there is a small leak past the flanges 13 and 14, since the leak has no effect on the insulating properties of the solid material filling the intermediate enclosure.

Figure 2:
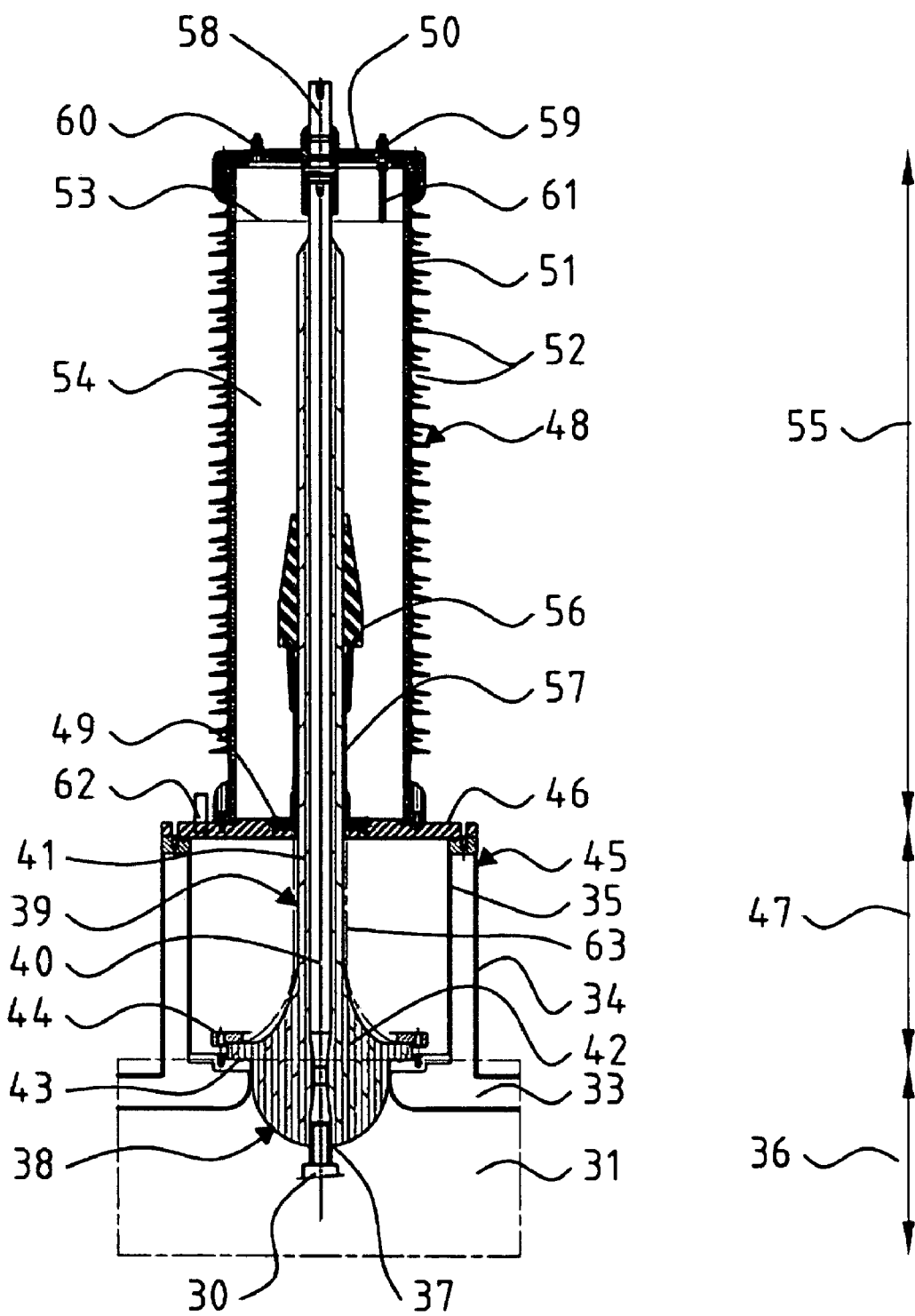
FIG. 2 is a longitudinal section of an embodiment of the invention.

In FIG. 2, which is a longitudinal section showing an embodiment of the invention, a superconductor cable 30 is cooled by a cryogenic fluid 31, e.g. liquid nitrogen, contained in a cryostat 33 having an outside wall 34 and an inside wall 35. The level of the vacuum between these two walls may be about $10^{-5}$ millibars (mbar), for example. The zone designated by reference 36 is at cryogenic temperature, which for so-called "high temperature" superconductors is about $-200°$ C.

The end of the superconductor cable is connected via an electrical connection 37 to the bottom end 38 of an electrical bushing 39. The bushing is constituted mainly by a central conductor 40 of copper or of aluminum alloy, having an electrically insulating sheath 41 molded thereabout, e.g. made of epoxy. It is terminated at its bottom end by a bulb 42 having a fastening collar 43. The portion of the bulb situated above the collar 43 has a flared shape, with the most widely flared portion being at the collar. A flange 44 secures the bulb 42 in leaktight manner against the inside wall 35 of the cryostat 33.

The inside and outside walls 35 and 34 of the cryostat are extended vertically to form the side walls of an intermediate enclosure 45. This enclosure is thus well insulated thermally. The bottom of this intermediate enclosure is closed in leak-tight manner by the bulb 42, and the top of the enclosure is closed by a plate 46 that may be made of a metal alloy (e.g. stainless steel or an aluminum alloy). The temperature of the zone 47 lies between cryogenic temperature and ambient temperature.

The outside wall of a section of the insulating sheath is covered in a layer 63 of electrically conductive material, e.g. by metallization. The metal deposited on this outside wall may be zinc sprayed onto the outside wall, for example. Alternatively, the wall may be made electrically conductive by being covered in a layer of conductive paint, paint containing silver. The section of the insulating sheath covered in the metal layer 63 extends from the collar 43 on the bulb 42 as far as the fastening and sealing flange 49 of the top plate 46 closing the top of the intermediate enclosure 45. The metal layer 63 is electrically connected to ground potential. It thus forms an electric screen having the effect of channeling the electric field lines between the central conductor 40 and the metal layer 63. Since the metal layer is connected to the electric potential of ground and since the superconductor cable is at high voltage, the bottom end 38 of the insulating sheath, and thus the metal layer 63, advantageously has a flared shape like the portion of the bulb 42 situated above the collar 43, so as to increase the creepage distance between ground and high voltage, thereby avoiding electrical breakdown at the end 38. Instead of a conductive layer 63 deposited on the outside wall of the insulation of the cable, which constitutes the preferred embodiment of the invention, it is also possible to use a cylindrical metal tube surrounding the outside wall of the insulating sheath 41 and having a flared shape at its end close to the bulb 42. Like the conductive layer 63, the tube should be connected to ground potential.

It should be observed that the temperature of the central conductor 40 in the zone 47 varies from cryogenic temperature at the bulb 42 to ambient temperature at the top plate 46. Since the resistivity of the central conductor 40 decreases with increasing temperature, it is advantageous to decrease the section of the central conductor at low temperatures in order to limit the flow of heat along the conductor between the portion at ambient temperature and the portion at cryogenic temperature, while maintaining heat losses by the Joule effect at a low level. Thus, in FIG. 2, the section of the central conductor 40 is smaller at the bulb 42 than at the top of the intermediate chamber 45. In theory, the section of the conductor should increase progressively from the connection 37 with the superconductor element all the way to the top plate 46 at ambient temperature. Nevertheless, it would be expensive to make such a conductor portion, and it suffices to implement this variation in section over a short length, as shown in FIG. 2.

The intermediate enclosure is preferably filled with a solid material of low thermal conductivity. The material is advantageously in the form of a foam, such as a polyurethane foam or a cellular glass foam, such as a cellular glass foam of the kind under the trademark Foamglas, for example. It is preferable to fill the intermediate enclosure completely with this solid material, but it is nevertheless possible to fill it in part only. In order to fill the intermediate enclosure, one or more blocks of solid foam can be machined, e.g. two blocks in the form of half-shells, or a single block machined with a central hole of shape complementary to the portion of the electrical bushing 39 that is situated in the intermediate enclosure 45, with the block(s) subsequently being put into place in the intermediate enclosure.

Above the intermediate enclosure 45, an enclosure 48 at ambient temperature is secured to the plate 46. The plate presents good thermal conductivity so as to establish good heat exchange between the ambient temperature of air and the bottom of the enclosure 48 at ambient temperature. The electrical bushing 39 passes through said top wall 46 in leaktight manner via a fastening and sealing flange 49 and penetrates outside the enclosure 48 through the top wall 50 of said enclosure at ambient temperature. The side wall of the enclosure is constituted by an electrical insulator 51, e.g. glass fiber reinforced epoxy, generally referred to as fiber reinforced polymer (FRP). The outside surface of this wall carries a succession of fins 52 of insulating material, e.g. of silicone, serving to lengthen the path length of any leakage current over the surface, due to impurities being deposited on said surface by surrounding pollution and rain. The enclosure 48 at ambient temperature is filled up to a level 53 with a liquid 54 that is a good electrical insulator, such as silicone oil. In addition to providing good electrical insulation for the electrical bushing 39, the liquid 54 facilitates achieving temperature stabilization inside the enclosure at ambient temperature. The zone 55 is thus at a temperature close to ambient.

A stress cone 56 situated in the enclosure 48 at ambient temperature surrounds the electrical bushing 39 where the metallized layer 63 comes to an end. The conductive portion of the stress cone is electrically connected to the metallized layer 63 and also to the leaktight fastening flange 49 that is electrically conductive, e.g. by means of taping 57 using semiconductor tapes. The metal layer 63 may come to an end level with the fastening flange 49, or it may be extended directly as far as the conductive portion of the stress cone 56, the essential point being to have good electrical continuity between the metal layer 63 and the conductive portion of the stress cone. The function of the stress cone is to deflect or spread out the electric field lines where the metallization comes to an end so as to avoid having a discontinuity that could lead to electrical breakdown. The electrical bushing 39 is terminated outside the enclosure 48 at ambient temperature by a connection tab 58 for feeding the superconductor cable with electricity at medium or high voltage or for feeding equipment at ambient temperature with electricity under medium or high voltage and coming from the superconductor cable 30.

The plate 46 is preferably provided with a safety valve 62 in order to exhaust any excess pressure from the intermediate enclosure 45 that might be due to cooling liquid leaking past the collar 43 and the fastening flange 44, with the cooling liquid then passing into the intermediate enclosure while in the form of a gas.

The enclosure at ambient temperature also has two connection valves 59 and 60 enabling it to be filled with oil, the valve 58 being connected to a dip tube 61 of polyethylene enabling the level of oil inside the enclosure to be monitored.

Since the electric field is confined between the central conductor 40 and the conductive layer 63 and is deflected at both ends of the conductor layer 63, firstly by the flared shape due to the shape of the bulb 42, and secondly by the stress cone 56, there is no need for the intermediate enclosure to be evacuated or filled with an electrically insulating material (e.g. a gas).

The above-described electrical connection structure having an intermediate enclosure that is advantageously filled with a solid material that is a good thermal insulator serves to provide a good temperature transition between the portion at cryogenic temperature and the portion at ambient temperature, with heat flow into the cryogenic liquid being limited and compatible with the operating conditions of the installation and with easy maintenance on site and in the workshop. The height of the structure, and in particular the height of the intermediate enclosure can readily be adapted to the temperature difference conditions between the cryogenic portion and the ambient portion, and to the electrical conditions such as the voltage and current values.

The embodiment described relates to connecting a superconductor cable. Nevertheless, it is obvious to the person skilled in the art that the invention applies to connecting any superconductor element at cryogenic temperature, and that needs to be connected to a device or apparatus or equipment at ambient temperature.

What is claimed is:

1. An electrical bushing enabling a connection to be made at ambient temperature to a superconductor element situated in an enclosure at cryogenic temperature comprising:
    an electrical bushing passing in succession through an enclosure at intermediate temperature between ambient temperature and cryogenic temperature; and
    an enclosure at ambient temperature, said bushing having at least a central electrical conductor surrounded by an electrically insulating sheath, wherein an electrically conductive screen connected to ground potential surrounds said insulating sheath over a section extending from the end of the bushing that is in contact with the enclosure at cryogenic temperature at least as far as the junction between the enclosure at intermediate temperature and the enclosure at ambient temperature
    and wherein the insulating sheath includes, at least one of the two ends of said section, electric field deflector means with the end of the insulating sheath of said section adjacent to the enclosure at cryogenic temperature being flared in shape, and covered in said metal screen.

2. An electrical bushing according to claim 1, wherein said screen is constituted by a metal layer bonded to the outside wall of the insulating sheath of said section.

3. An electrical bushing according to claim 2, wherein said metal layer is formed by a layer of zinc deposited on the outside wall of the insulating sheath of said section.

4. An electrical bushing according to claim 2, wherein said metal layer is formed by a silver-containing paint.

5. An electrical bushing according to claim 1, wherein the end of the insulating sheath of said section adjacent to the enclosure at cryogenic temperature is in the form of a bulb placed between the enclosure at cryogenic temperature and the enclosure at intermediate temperature, the portion of the bulb situated in the enclosure at intermediate temperature having said flared shape.

6. An electrical bushing according to claim 1, wherein the screen extends into the enclosure at ambient temperature, and wherein a stress cone is secured around said insulating sheath and is electrically connected to the end of the screen situated in the enclosure at ambient temperature.

7. An electrical bushing according to claim 1, wherein the coefficients of thermal expansion of the materials constituting the central conductor and the insulating sheath are approximately identical, such that said materials are compatible with cryogenic temperature and ambient temperature.

8. An electrical bushing according to claim 7, wherein the insulating sheath is made of epoxy and the central conductor of aluminum alloy.

9. An electrical bushing according to claim 1, wherein the section of the portion of the central conductor situated beside the enclosure at cryogenic temperature is smaller over a determined length than the section of the portion of the central conductor that is situated in the enclosure at ambient temperature.

10. An electrical bushing according to claim 1, wherein the enclosure at intermediate temperature is filled at least in part with a solid material having low thermal conductivity.

11. An electrical bushing according to claim 10, wherein said material is based on foam.

12. An electrical bushing according to claim 10, wherein said material is a cellular glass foam or a polyurethane foam.

13. An electrical bushing enabling a connection to be made at ambient temperature to a superconductor element situated in an enclosure at cryogenic temperature comprising:
   an electrical bushing passing in succession through an enclosure at intermediate temperature between ambient temperature and cryogenic temperature; and
   an enclosure at ambient temperature, said bushing having at least a central electrical conductor surrounded by an electrically insulating sheath, wherein an electrically conductive screen connected to ground potential surrounds said insulating sheath over a section extending from the end of the bushing that is in contact with the enclosure at cryogenic temperature at least as far as the junction between the enclosure at intermediate temperature and the enclosure at ambient temperature
   and wherein the insulating sheath includes, at least one of the two ends of said section, electric field deflector means with the end of the insulating sheath of said section adjacent to the enclosure at cryogenic temperature being flared in shape, and covered in said metal screen, such that the end of the insulating sheath of said section adjacent to the enclosure at cryogenic temperature is in the form of a bulb placed between the enclosure at cryogenic temperature and the enclosure at intermediate temperature, the portion of the bulb situated in the enclosure at intermediate temperature having said flared shape.

14. An electrical bushing enabling a connection to be made at ambient temperature to a superconductor element situated in an enclosure at cryogenic temperature comprising:
   an electrical bushing passing in succession through an enclosure at intermediate temperature between ambient temperature and cryogenic temperature; and
   an enclosure at ambient temperature, said bushing having at least a central electrical conductor surrounded by an electrically insulating sheath, wherein an electrically conductive screen connected to ground potential surrounds said insulating sheath over a section extending from the end of the bushing that is in contact with the enclosure at cryogenic temperature at least as far as the junction between the enclosure at intermediate temperature and the enclosure at ambient temperature
   and wherein the enclosure at intermediate temperature is filled at least in part with a solid material having low thermal conductivity.

* * * * *